(12) United States Patent
Adler (10) Patent No.: US 8,484,672 B2
(45) Date of Patent: Jul. 9, 2013

(54) METHOD AND DEVICE FOR UPDATING REGIONAL RATING TABLE

(75) Inventor: Glenn Adler, Redwood City, CA (US)

(73) Assignee: Shenzhen TCL New Technology Ltd., Guangdong (CN)

( * ) Notice: Subject to any disclaimer, the term of this patent is extended or adjusted under 35 U.S.C. 154(b) by 802 days.

(21) Appl. No.: 12/654,871

(22) Filed: Jan. 7, 2010

(65) Prior Publication Data

US 2011/0167443 A1     Jul. 7, 2011

(51) Int. Cl.
    *H04N 7/16*     (2011.01)
(52) U.S. Cl.
    USPC ............................................. 725/25; 725/151
(58) Field of Classification Search
    None
    See application file for complete search history.

(56) References Cited

U.S. PATENT DOCUMENTS

| | | | |
|---|---|---|---|
| 5,592,551 A * | 1/1997 | Lett et al. ....................... | 380/211 |
| 5,828,402 A * | 10/1998 | Collings ........................ | 725/28 |
| 6,018,765 A | 1/2000 | Durana et al. | |
| 6,763,522 B1 * | 7/2004 | Kondo et al. ................... | 725/39 |
| 7,664,951 B2 * | 2/2010 | Fujinami ........................ | 713/168 |
| 8,205,224 B2 * | 6/2012 | Kim ................................ | 725/28 |
| 2001/0011372 A1 * | 8/2001 | Lee ................................. | 725/39 |
| 2002/0057893 A1 | 5/2002 | Wood et al. | |
| 2002/0152467 A1 * | 10/2002 | Fiallos ........................... | 725/50 |
| 2006/0130118 A1 * | 6/2006 | Damm .......................... | 725/135 |
| 2006/0242683 A1 * | 10/2006 | Medford et al. .............. | 725/139 |
| 2006/0268778 A1 * | 11/2006 | Kirk et al. ..................... | 370/329 |
| 2007/0204296 A1 | 8/2007 | Lee et al. | |
| 2007/0204304 A1 * | 8/2007 | Kim ............................... | 725/51 |
| 2007/0214472 A1 | 9/2007 | Kim et al. | |
| 2008/0069147 A1 | 3/2008 | Lee et al. | |
| 2008/0104628 A1 * | 5/2008 | Mori et al. ..................... | 725/28 |
| 2008/0104629 A1 * | 5/2008 | Okamoto et al. .............. | 725/28 |
| 2008/0168486 A1 * | 7/2008 | Song et al. ..................... | 725/28 |
| 2009/0055882 A1 | 2/2009 | Song et al. | |
| 2009/0204986 A1 | 8/2009 | Lee et al. | |
| 2009/0210893 A1 | 8/2009 | Yu | |
| 2009/0313656 A1 * | 12/2009 | Lee ................................ | 725/50 |
| 2010/0013551 A1 * | 1/2010 | Reams .......................... | 327/544 |

OTHER PUBLICATIONS

"Downloadable U.S. Region Rating System White Paper," *Consumer Electronics Association*, Arlington, Virginia, Dec. 15, 2005 (11 pages).

International Search Report and Written Opinion for PCT/US2010/061479 mailed Feb. 25, 2011, from the United States International Searching Authority.

\* cited by examiner

*Primary Examiner* — Pankaj Kumar
*Assistant Examiner* — Timothy Newlin
(74) *Attorney, Agent, or Firm* — Finnegan, Henderson, Farabow, Garrett & Dunner, LLP (57) ABSTRACT

A method performed by a digital television receiver associated with a television includes storing in a memory a first rating configuration, including a region identification of the first rating configuration and a version identification of the first rating configuration, for rating a television program in accordance with a rating scheme, and storing in the memory an identification of a first television channel as a default channel for the rating scheme. The method further includes receiving a subset of a group of transport packets via a receiving channel, comparing the region identification and the version identification of the first and the second rating configurations, and if the region identifications are the same, and the version identifications of the first and the second rating configurations indicate that the second configuration is not newer than the first rating configuration, not storing the second configuration.

26 Claims, 10 Drawing Sheets

| Item name | Description | Bits |
|---|---|---|
| Sync byte | 1 byte synchronization code of value 0x47 | 8 |
| Transport error indicator | 1 bit flag | 1 |
| Payload unit start indicator | 1 bit flag which indicates that the payload of this transport packet is the start of an elementary stream packet | 1 |
| Transport priority | 1 bit flag used to help decode packets in the correct order | 1 |
| PID (packet identifier) | 13 bit code indicating which elementary stream the data stored in this transport packets payload is from | 13 |
| Transport scrambling control | 2 bit field indicating the scrambling mode of the packet | 2 |
| Adaption field control | 2 bit field indicating if there is an adaption field (additional header information) following the transport stream header | 2 |
| Continuity counter | 4 bit counter which increments with each transport packet containing the said PID. When it reaches 15 it loops back to zero | 4 |
| | Total | 32 |

FIG. 2B

| Syntax of MPEG-2 Private Section | Bytes | | Bits | Format |
|---|---|---|---|---|
| table_id | 1 | | 8 | uimsbf |
| section_syntax_indicator | 2 | ← 3 → | 1 | '1' |
| private_indicator | | | 1 | '0' |
| reserved | | | 2 | '11' |
| section_length | | | 12 | uimsbf |
| table_id_extension | 2 | ← 6 → | 16 | uimsbf |
| reserved | 1 | | 2 | '11' |
| version_number | | | 5 | uimsbf |
| current_next_indicator | | | 1 | bslbf |
| section_number | 1 | | 8 | uimsbf |
| last_section_number | 1 | | 8 | uimsbf |
| protocol_version | | | 8 | uimsbf |
| actual_table_data | N | | 8*N | - |
| CRC_32 | 4 | 4 | 32 | rpchof |

FIG. 2C

| Syntax of MPEG-2 Private Section | Bytes | STT | MGT | TVCT | RRT | EIT-j | ETT-k |
|---|---|---|---|---|---|---|---|
| table_id | 1 | 0xCD | 0xC7 | 0xC8 | 0xCA | 0xCB | 0xCC |
| section_syntax_indicator |  | '1' | '1' | '1' | '1' | '1' | '1' |
| private_indicator | 3 | '1' | '1' | '1' | '1' | '1' | '1' |
| reserved |  | '11' | '11' | '11' | '11' | '11' | '11' |
| section_length (allowed values) | 2 | 17-1021 | 14-4093 | 13-1021 | 18-1021 | 11-4093 | 14-4093 |
| table_id_extension | 2 | 0x0000 | 0x0000 | TSID | rating_region | source_id | 0x0000 |
| reserved |  | '11' | '11' | '11' | '11' | '11' | '11' |
| version_number | 6 | 0 | 0-31 | 0-31 | 0-31 | 0-31 | 0-31 |
| current_next_indicator |  | '1' | '1' | '1' | '1' | '1' | '1' |
| section_number | 1 | 0 | 0 | 0-1 | 0 | 0 | 0 |
| last_section_number | 1 | 0 | 0 | 0-255 | 0 | 0-255 | 0 |
| protocol_version | 1 | 0 | 0 | 0-255 | 0 | 0-255 | 0 |
| actual_table_data | N | - | - | - | - | - | - |
| CRC_32 | 4 | rpchof | rpchof | rpchof | rpchof | rpchof | rpchof |

FIG. 2D

| Syntax Element | Value |
| --- | --- |
| rating_region | 0x05 |
| version_number | 00000 |
| rating_region_name_text() | US (Downloadable) |
| dimensions_defined | 0x08 |

252 — rating_region
242 — version_number
254 — rating_region_name_text()
256 — dimensions_defined

FIG. 5 under the page number "US 8,484,672 B2"

METHOD AND DEVICE FOR UPDATING REGIONAL RATING TABLE

FIELD OF THE INVENTION

This invention is directed generally to television program rating and, more particularly, to updating regional rating information.

BACKGROUND

A digital television receives television programs through streams of transport packets which are broadcast by one or more television broadcasters; and transformed by a television receiver to audio and video signals which are then transmitted to the television set which can include, for example, a video display and speakers. In addition to audio and video signals for the programs, the stream of packets also include streams of metadata information composed of metadata packets which describe those programs. The metadata information can include, for example, information about the title, the timing, and the rating of each program. Metadata information are often broadcast based on industry standards, including Advanced Television Systems Committee (ATSC) standards, e.g., ATSC A/65C, and Electronic Industries Alliance standards EIA-766 and CEA-766, the contents of which are incorporated herein by reference.

A program rating states the level of a program's content based on a rating scheme. A rating scheme can define one or more rating categories, each called a rating "dimension". For each dimension, the number of levels, and possibly a label (value) for each level, may be defined. For example, a rating scheme may include a "violence" dimension with four levels, labeled as, in increasing order of violence, "none", "mild", "strong", and "graphic". Similarly, a rating scheme may include a "language" dimension with five levels labeled as "none", "mild", "coarse", "strong", and "explicit"; a "sexuality" dimension with five levels labeled as "none", "mature themes", "brief nudity", "extended nudity", and "explicit sexual activity"; or a "humor" dimension, with four levels as "none", "mild", "high", and "Extreme". A rating scheme may also label the rating levels in a dimension by numbers instead of names. Alternatively, a rating scheme may categorize a program content not based on any specific dimension, but by using general rating labels, e.g., "general audience", "PG", "Restricted", and "X-rated", sorted according to increasing order of restrictions. Different rating schemes may share one or more of their dimensions and, for a common dimension, may use the same or different levels or labels.

The metadata packets associated with a program can include the rating level of the program content in one or more dimensions as defined by a specific rating scheme. For instance, program metadata may rate a program as "PG", "Violence: mild", "Language: coarse". This rating information can be used by viewers to decide in advance whether to watch a program. The rating information can also be used, for example, by parents to prevent their children from viewing certain programs which the parents deem inappropriate.

A user can configure a television receiver by setting rating preferences such that programs with specific ratings are automatically blocked and not shown by their television. A blocking mechanism may utilize user preference in a categorical manner, to block programs having a level that is the same as those specified by the user; or in an ordinal manner, to block programs having levels that are the same as or more restricted than those specified by the user. For instance, in the above example for general rating labels, a user may set a preference for blocking programs with a "Restricted" rating. In a categorical mechanism, only programs with the "Restricted" rating will be blocked, while in an ordinal mechanism, programs with both "Restricted," or "X-rated" ratings will be blocked. Such preference indicates that the user only accepts programs with a rating of "general audience" or "PG". In this case, the television receiver would automatically block any program with a rating label more restricted than "PG", e.g., "Restricted", or "X-rated". Similarly, a user may set a preference for blocking all programs with a violence level above "mild", or a sexuality level above "brief nudity". A user may be able to change those preferences, or to override them for specific programs or at specific times.

In order to interpret the rating information in the metadata packets for a specific program, the television receiver requires the rating scheme used by the broadcaster for rating that specific program. Rating schemes may differ in different regions. Moreover, such regional rating schemes may be updated to new versions, e.g., upon request by national or state regulatory bodies, for example, by the Federal Communication Commission (FCC) in the U.S. Also, other organizations may create and register a new regional rating scheme, or a new version of an existing regional rating.

A digital television may include settings, e.g., information and algorithms, needed to decode a program rating that is based on a specific regional rating scheme. A manufacturer of a digital television may pre-program the television's settings such that it can decode an existing version of the regional rating scheme for one or more regions, e.g., for the U.S. or Canada. A user of such a television can thus view ratings of, and set rating preferences for viewing, programs that are rated based on those pre-programmed regional schemes. However, a program's rating may be based on a not pre-programmed regional scheme, for example, if the television is shipped to and used in a region other than those related to the television's pre-programmed regional schemes. Alternatively, a program's rating may be based on a not pre-programmed version of a pre-programmed regional scheme, for example, a new version of the regional scheme that was updated after the television was manufactured. In such occasions, a mechanism is required for updating the television settings such that it can decode that rating which is based on a not pre-programmed regional scheme or a not pre-programmed version of a regional scheme.

Generally, there are at least two methods for updating a television receiver's settings with respect to program ratings. A television may have a user interface such that a user can re-program the television and enter the required new information for a new setting. Alternatively, a television may have a mechanism to receive the new information through the stream of broadcast packets and update its own settings. In the second mechanism, at an agreed-upon time after a new rating scheme is created and approved, the new rating scheme and also programs that are rated based on that new scheme start being broadcast. A television receiver saves the broadcast rating scheme and utilizes it in interpreting the rating information to determine the respective ratings of the programs. A television receiver must regularly access the broadcast rating scheme to determine whether there has been a change in the previously saved rating scheme, and therefore whether it must save and use an updated rating scheme.

SUMMARY OF THE INVENTION

In accordance with the present disclosure, there is provided a method performed by a digital television receiver associated with a television, comprising: storing in a memory a first rating configuration, including a region identification of the first rating configuration and a version identification of the first rating configuration, for rating a television program in accordance with a rating scheme; storing in the memory an identification of a first television channel as a default channel for the rating scheme; receiving a subset of a group of transport packets via a receiving channel that is one of the first television channel or a second television channel; extracting a region identification of a second rating configuration and a version identification of the second rating configuration from the subset of the group of transport packets; comparing the region identification and the version identification of the second rating configuration with the region identification and the version identification of the first rating configuration, respectively; and if the region identifications of the first and the second rating configurations are the same, and the version identifications of the first and the second rating configurations indicate that the second configuration is not newer than the first rating configuration, not storing the second configuration.

Also in accordance with the present disclosure, there is provided a digital television receiver which receives television signals via one or more television channels, the television signals including regional rating table (RRT) information used for rating a television program embedded in the television signals, the digital television receiver comprising: a memory for storing a previously received RRT, an RRT packet identifier, an RRT table identifier, an RRT region identification corresponding to the previously received RRT, and an RRT version identification corresponding to the previously received RRT; an RRT downloader; an RRT detector for detecting an embedded RRT which is embedded in the received television signals, the RRT detector comprising: an RRT packet identifier module to identify, from among a plurality of transport packets received via a specific channel of the one or more television channels, a specific transport packet as an RRT header packet associated with a plurality of RRT packets which carry information related to the embedded RRT, wherein the RRT packet identifier module identifies the specific transport packet as an RRT header packet by extracting from the specific transport packet an embedded packet identifier and an embedded table identifier, and identifying the embedded packet identifier and the embedded table identifier to be the same as the stored RRT packet identifier and the stored RRT table identifier, respectively; and an RRT update module for determining whether the embedded RRT is a newer version of the stored previously received RRT, by extracting from the RRT header packet an embedded RRT region identification and an embedded RRT version identification, and by comparing the embedded RRT region identification and the embedded RRT version identification with the stored RRT region identification and the stored RRT version identification, respectively, the RRT update module causing the digital television receiver to skip analyzing a remainder of the plurality of RRT packets if the RRT update module determines that the embedded and the stored RRT region identifications are the same and the embedded RRT is not newer than the previously stored RRT, and, otherwise calling the RRT downloader; and the RRT downloader for tuning into a default channel for the stored RRT region identification and for downloading the embedded RRT via the default channel for the stored RRT region, if the embedded and stored RRT region identifications are the same and the embedded and stored RRT version identifications indicate that the embedded RRT is newer than the stored RRT.

Further, in accordance with the present disclosure, there is provided a method performed by a digital television receiver for managing regional rating table (RRT) information used for rating a television program embedded in the television signals received via one or more television channels, the method comprising: storing in a memory a previously received RRT, an RRT packet identifier, an RRT table identifier, an RRT region identification corresponding to the previously received RRT, and an RRT version identification corresponding to the previously received RRT; detecting an embedded RRT which is embedded in the received television signals, by identifying, from among a plurality of transport packets received via a specific channel of the one or more television channels, a specific transport packet as an RRT header packet associated with a plurality of RRT packets which carry information related to the embedded RRT, wherein the identifying the specific transport packet as an RRT header packet is performed by extracting from the specific transport packet an embedded packet identifier and an embedded table identifier, and identifying the embedded packet identifier and the embedded table identifier to be the same as the stored RRT packet identifier and the stored RRT table identifier, respectively; determining whether the embedded RRT is different from the stored previously received RRT, by extracting from the RRT header packet an embedded RRT region identification and an embedded RRT version identification, and by comparing the embedded RRT region identification and the embedded RRT version identification with the stored RRT region identification and the stored RRT version identification, respectively; causing the digital television receiver to skip analyzing a remainder of the plurality of RRT packets, if the embedded RRT region identification and the embedded RRT version identification are same as the stored RRT region identification and the stored RRT version identification, respectively; and tuning into a default channel for the stored RRT region identification and downloading the embedded RRT via the default channel for the stored RRT region, if the embedded RRT region identification is same as the stored RRT region identification and the RRT version identification is different from the stored RRT version identification.

Moreover, in accordance with the present disclosure, there is provided a method performed by a digital television receiver associated with a television including a memory for saving a first rating configuration corresponding to a rating scheme, the method comprising: receiving a region identification and a version identification of a second rating configuration; comparing the region identification and the version identification of the second rating configuration respectively with a region identification and a version identification of the first rating configuration; if the region identification of the second rating configuration is the same as the region identification of the first rating configuration, and the version identification of the second rating configuration is newer than the version identification of the first rating configuration, storing in the memory the second rating configuration, including the region identification and the version identification of the second rating configuration, for rating in accordance with the rating scheme.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1A:
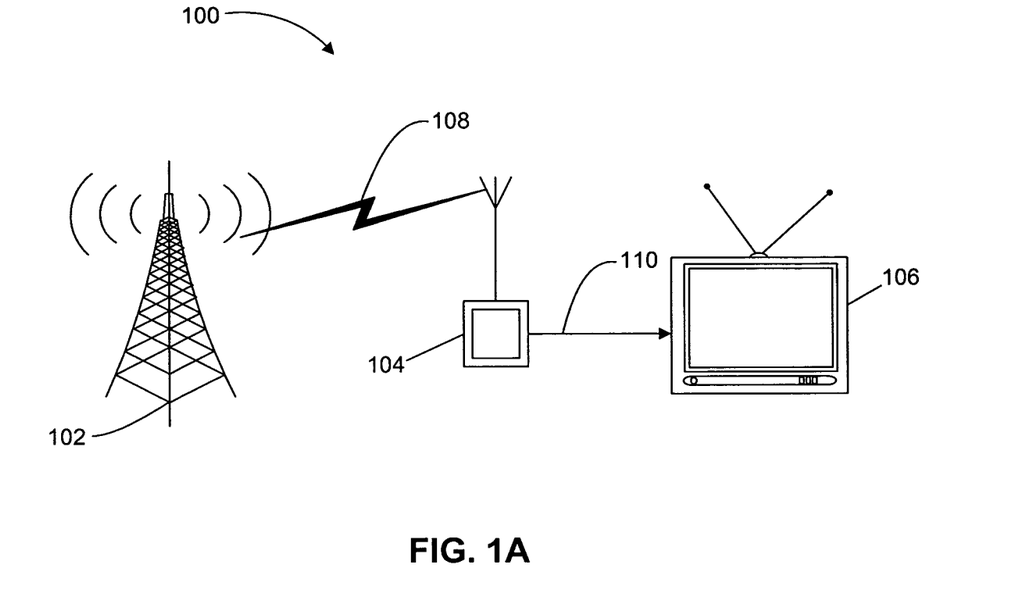
FIG. 1A illustrates a schematic of a digital television broadcasting and receiving system according to an exemplary embodiment.

FIG. 1A illustrates a schematic of a digital television (DTV) broadcasting and receiving system 100 according to an exemplary embodiment. System 100 includes a broadcaster 102, a digital television receiver (DTV receiver) 104, and a television 106. Broadcaster 102 is a television broadcaster, which broadcasts DTV signals 108 to one or more DTV receivers 104. In some embodiments, broadcaster 102 is a radio frequency broadcaster which transmits DTV signals 108 using radio frequency electromagnetic waves. In some embodiments, broadcaster 102 is a cable television broadcaster, which transmits DTV signals 108 to DTV receiver 106 using a cable connection between broadcaster 102 and DTV receiver 106. In some embodiments, broadcaster 102 is a satellite broadcaster or a telephone service provider that transmits DTV signals 108 via, e.g., fiber optic cable.

DTV receiver 104 is a receiver which receives DTV signals 108, processes those signals, and transforms at least part of those signals into audio/visual (AN) signals which correspond to television programs and are usable by television 106, with which DTV receiver 104 is associated. The AN signals are transmitted to television 106 via a connection 110. In various embodiments, connection 110 is a wired or a wireless connection between DTV receiver 104 and television 106. Television 106 displays the video signals and plays the audio signals that it receives from DTV receiver 104. In various embodiments, DTV receiver 104 is a device separate from television 106, or is included within television 106.

In some embodiments, DTV receiver 104 is also responsible for saving the one or more ratings schemes used for television programs, and the rating preferences set by the users. In some embodiments, DTV receiver 104 also decodes the rating level of received television signals and compares that rating level with user preferences, and accordingly allows or blocks transmission of those signals to television 106.

Figure 1B:
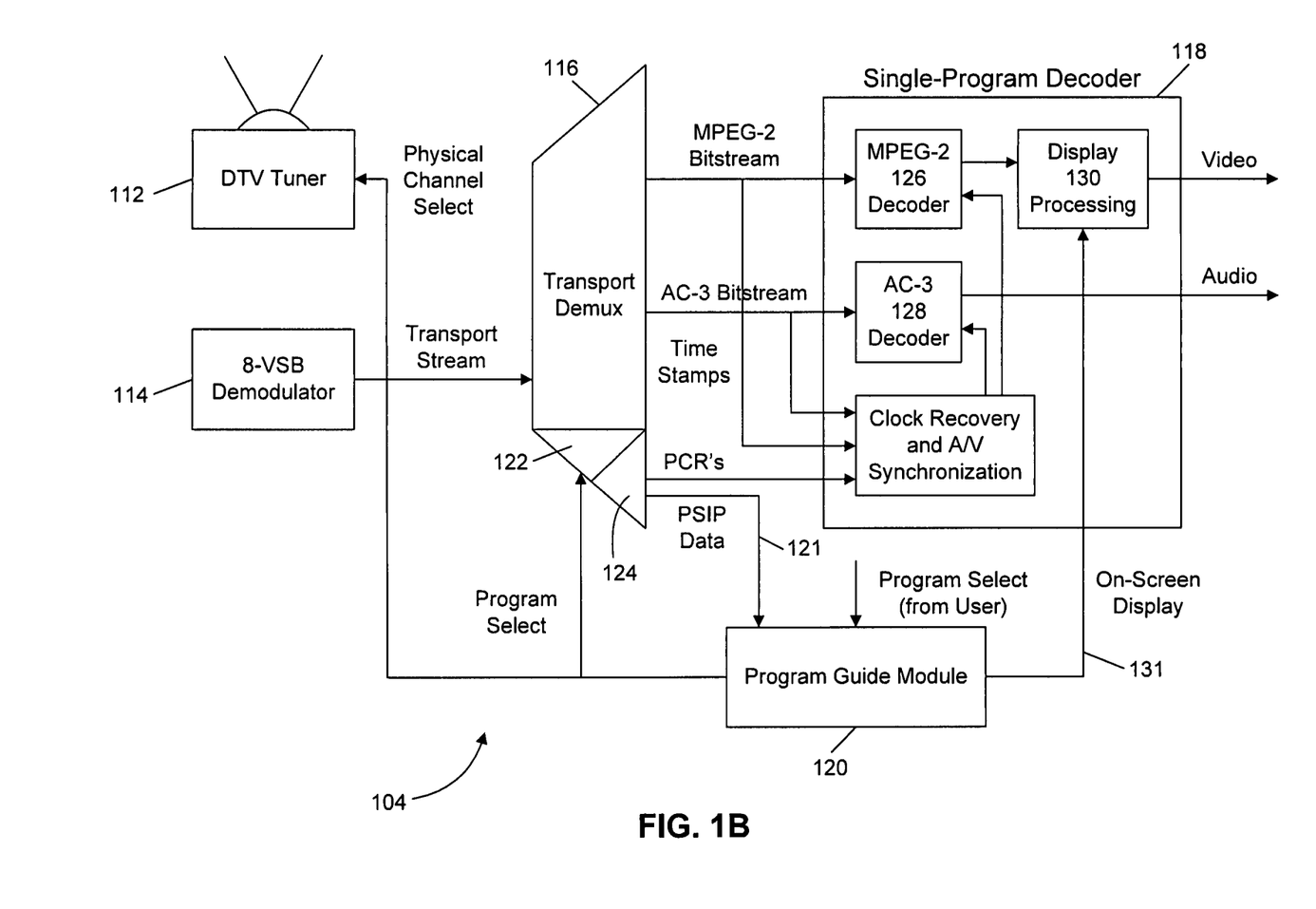
FIG. 1B illustrates a block diagram of a digital television receiver according to an exemplary embodiment.

FIG. 1B illustrates a block diagram of DTV receiver 104 according to an exemplary embodiment. DTV receiver 104 includes a digital television tuner (DTV tuner) 112, a demodulator 114, a demultiplexer (demux) 116, a decoder 118, and a program guide module 120.

DTV tuner 112 is a receiver which tunes into and receives DTV signals 108 and provides those signals to demodulator 114. Demodulator 114 demodulates the received signals and provides the demodulated signals to demux 116. In some embodiments, demodulator 114 is an eight-level vestigial sideband modulation (8-VSB) demodulator.

Demux 116 receives the demodulated signals, and demultiplexes those signals into audio and video (NV) signals for television programs, AN synchronization signals, and metadata information for those programs. The metadata information is transmitted to program guide module 120 as a processed metadata stream 121. In some embodiments, processed metadata stream 121 includes information about a rating and a rating scheme, in a format consistent with a Program and System Information Protocol (PSIP) which is defined, e.g., in ATSC A/65-C. PSIP information include one or more regional rating tables (RRTs) which describe the rating scheme used for a program. PSIP and RRT are explained in more detail below. Demux 116 includes an RRT detector 122 and an RRT downloader 124, which respectively detect and download an updated RRT. In various embodiments, RRT detector 122 or RRT downloader 124, or both, may be located within program guide module 120 or between demux 116 and program guide module 120, and are modules for processing metadata stream provided by demux 116 for use by program guide module 120.

Demux 116 provides A/V signals and synchronization information to decoder 118. In some embodiments, the video signals are provided as a bitstream using MPEG-2 compression format, while the audio signals are provided as a bitstream using AC-3 compression format. Decoder 118 includes one or more decoder modules for decoding the A/V signals. In some embodiments, the decoder modules include an MPEG-2 decoder 126 and an AC-3 decoder 128, which respectively decode the MPEG-2 and AC-3 bitstreams into video and audio signals that are usable by and provided to television 106. The video signals provided to television 106 pass through a display processing module 130 which, based on an input 131 from program guide module 120, may pass or block the video signal.

Program guide module 120 receives processed metadata stream 121 after being processed by RRT detector 122 and RRT downloader 124. Specifically, in some embodiments, program guide module 120 extracts from processed metadata stream 121 rating scheme information and stores this information in its memory. In some embodiments, program guide module 120 also receives, through, e.g., a user input device, user rating preferences and stores those preferences in its memory. Moreover, program guide module 120 receives, through processed metadata stream 121, rating information (also referred to as Content Advisory Descriptor (CAD)) for a particular program or a section of a particular program. Program guide module 120 interprets the received rating information for the particular program or section thereof, based on the stored rating scheme, and then compares that received rating information with the stored user preference. Accordingly, program guide module 120 provides input 131 to display processing module 130, instructing it to pass or block the television program signals. In some embodiments, the rating information is provided as one rating level for the entire program and therefore the entire program will be blocked or passed. In some other embodiments, the rating information is provided as separate ratings for one or more sections, e.g., one or more scenes, of a particular program, and therefore each section can be blocked or passed, independently.

Demux 116 regularly receives, as part of the demodulated signals, metadata information which include rating schemes, as included in an RRT. As long as the RRT has not changed, this received data is a duplicate of what is already saved by DTV receiver 104. RRT detector 122 and RRT downloader 124 detect which part of the signals carry the RRT, examine this information, and provide it to program guide module 120, if the received RRT is an update to, and not a duplicate of, the RRT already saved by DTV receiver 104.

Figure 1C:
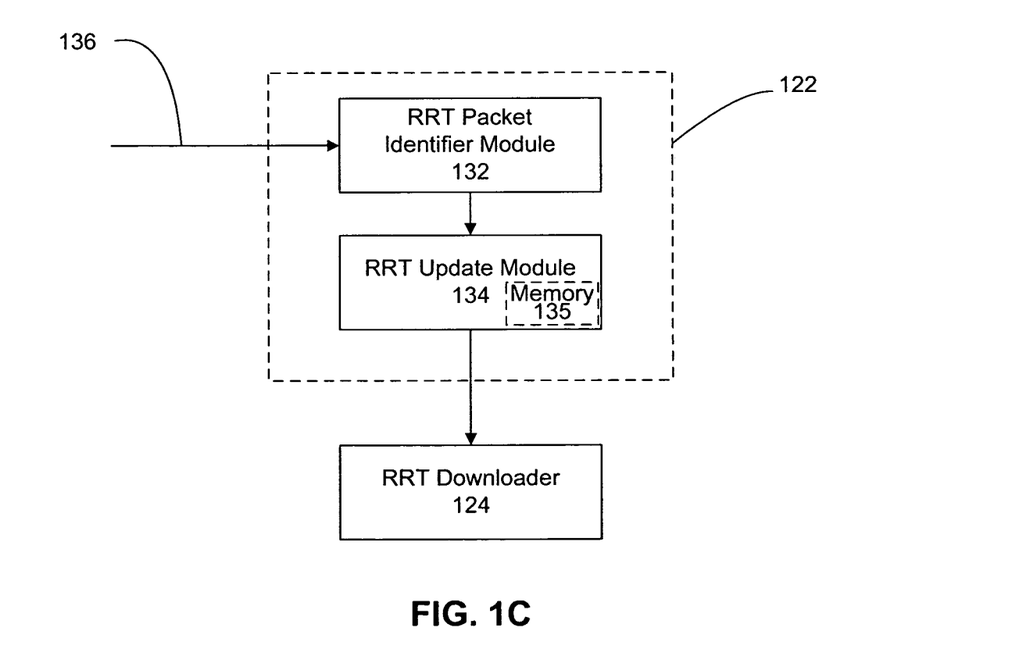
FIG. 1C illustrates a block diagram of a regional rating table (RRT) detector and an RRT downloader, according to an exemplary embodiment.

FIG. 1C illustrates a block diagram of RRT detector 122 and RRT downloader 124, according to an exemplary embodiment. RRT detector 122 includes an RRT packet identifier module 132, an RRT update module 134, and a memory 135. RRT packet identifier module 132 receives a metadata stream 136 which results from demultiplexing by, for example, other modules in demux 116. RRT packet identifier module 132 analyzes packets included in metadata stream 136, identifies packets that carry information about an RRT, and provides such packets to RRT update module 134. RRT update module 134, on the other hand, determines whether the newly received RRT is related to an updated rating scheme or is related to a rating scheme that was previously received and stored by DTV receiver 104. To that end, in some embodiments, RRT update module 134 compares information in the newly received RRT with information about previously received RRTs, as, for example, stored in memory 135. In some embodiments, memory 135 is part of RRT Update module 134. In some other embodiments, memory 135 is located outside RRT detector 122, e.g., in program guide module 120. Alternatively, two or more modules may each have their own memory to store the information that they receive or access. If the rating scheme is not an updated rating scheme, RRT update module 134 discards all packets carrying the information about the RRT. Otherwise, RRT update module 134 initiates RRT downloader 124 to download the updated RRT. RRT downloader 124 downloads the updated RRT and stores it in memory 135 to be used for rating processes.

In some embodiments, in order to detect and analyze rating scheme information included in metadata stream 136, RRT detector 122 evaluates the structure of packets in metadata stream 136. In some embodiments which apply the MPEG-2 standard for coding audio and video signals, metadata stream 136 is formatted as an MPEG-2 transport stream. The MPEG-2 transport stream is a continuous string of transport packets, which can be decoded from any point. Specifically, the transport stream carries metadata information as defined by PSIP. PSIP data consists of a hierarchical set of tables, which can include base tables and non-base tables. A base table can be an RRT, a system time table STT, a master guide table MGT, or a virtual channel table VCT. A non-base table can be an event information table EIT, or an extended text table EU. The RRT carries rating schemes for any country that adopts MPEG-2 standard, the SU provides time-of-day information, the MGT provides information on all other PSIP tables, e.g., non-base tables, and the VCT provides information on channels.

The EIT provides information about each event or TV program associated with each of the virtual channels, which can be used to construct an Electronic Program Guide (EPG). Specifically, the EIT for each program can include a CAD section which provides information about the rating of the program. The CAD may contain a rating value for the program based on one or more of the dimensions in a regional rating scheme, as specified by an RRT. Moreover, the CAD may provide the rating information for a program based on more than one regional rating schemes. In some embodiments, consistent with the ATSC A/65C standard, the CAD is used to indicate, for a given event, ratings for any or all of the rating dimensions defined in the RRT. Further, for each event, ratings may be given for any or all of the defined regions, up to a maximum of eight regions. DTV receiver 104 may be located in a region that is covered by more than one rating scheme, e.g., located near the border of the U.S. and Canada, and therefore covered by both U.S. and Canadian rating schemes. In such cases, DTV receiver 104 may receive multiple RRTs, each related to one of those rating schemes. Moreover, different programs received by DTV receiver 104 may be rated based on one or another of those multiple RRTs.

Figure 2A:
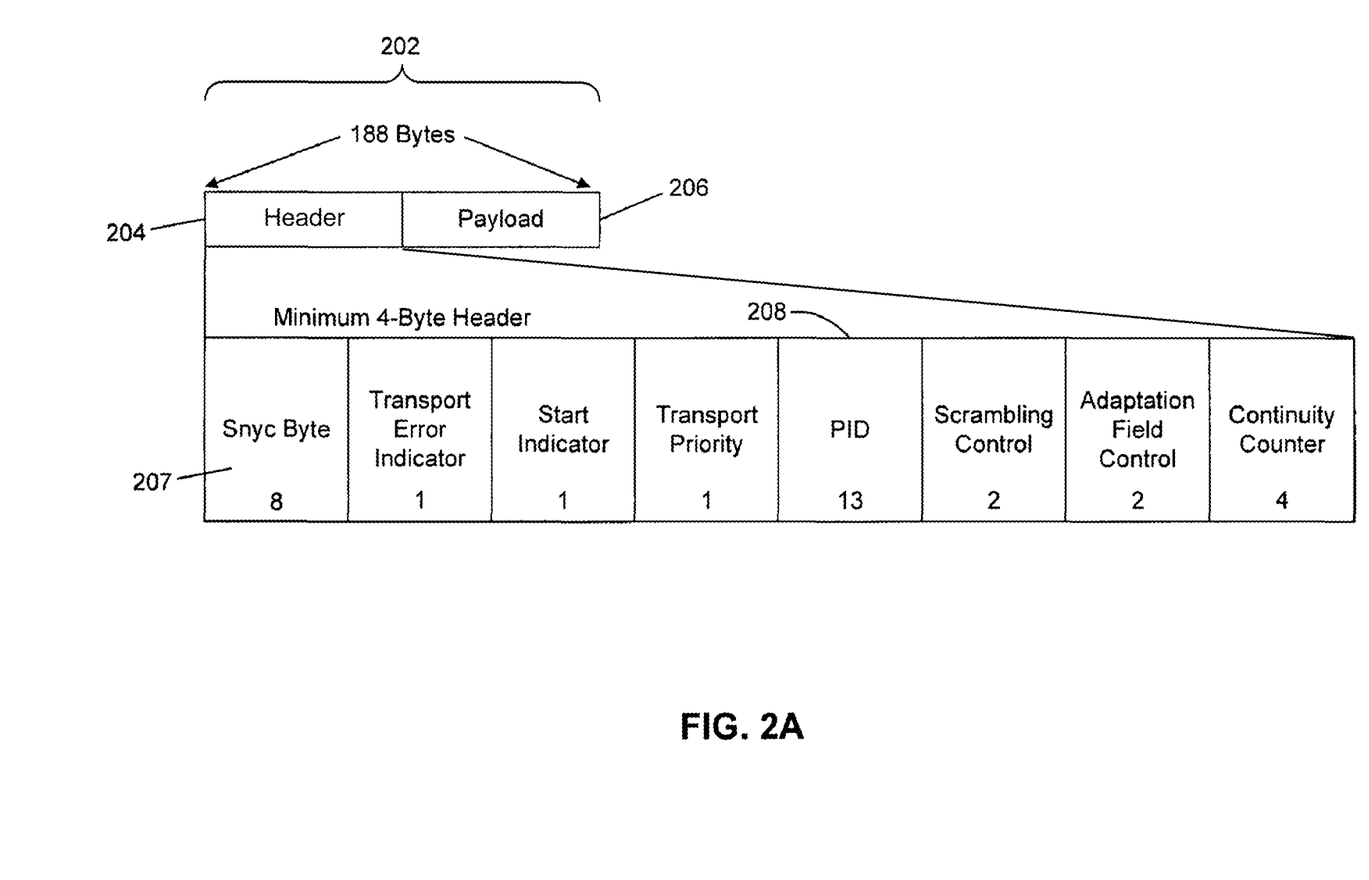
FIGS. 2A-2E illustrate the structure and content of packets received by a digital television receiver according to an exemplary embodiment.
Figure 2B:
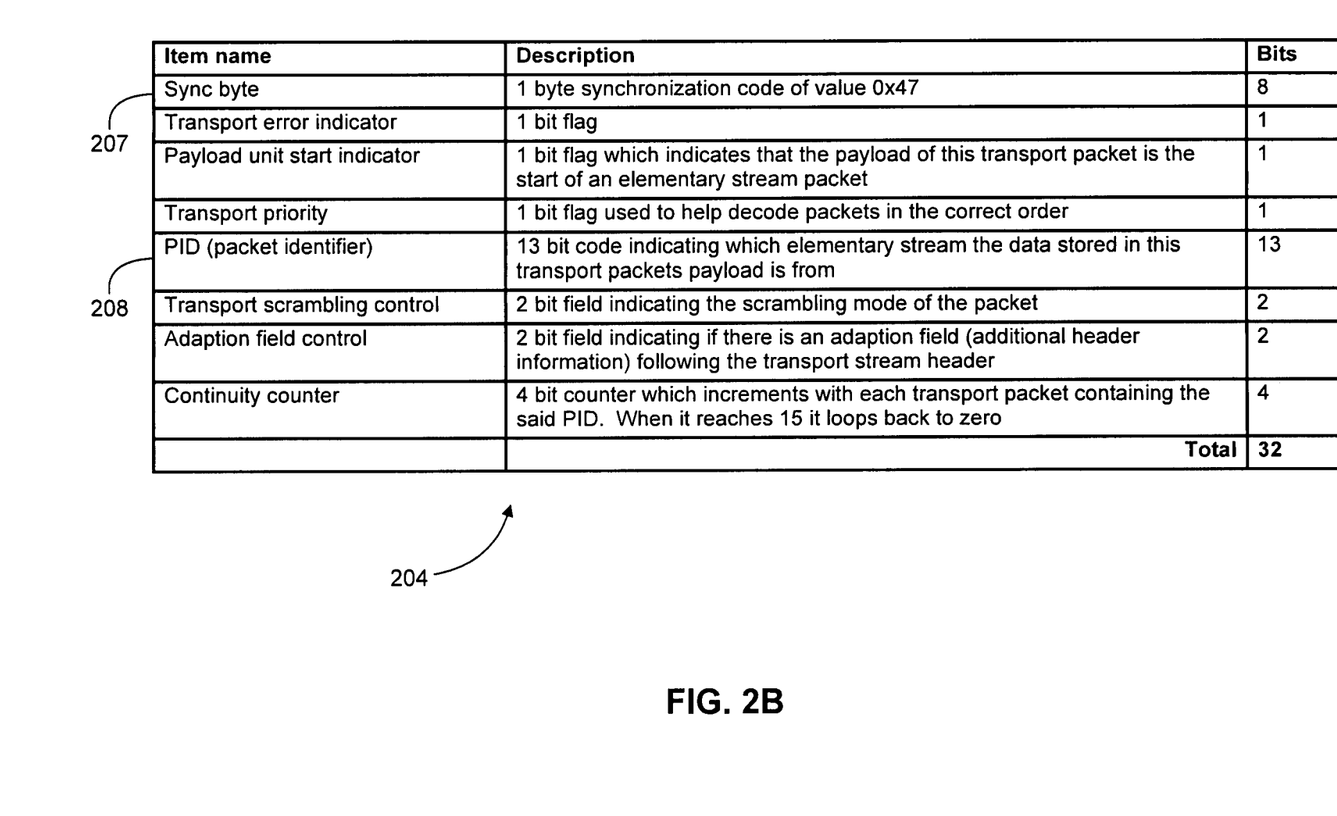

MPEG-2 transport packets have a pre-defined structure. FIGS. 2A and 2B depict the structure of an MPEG-2 transport packet, as used by some embodiments. FIG. 2A shows a standard MPEG-2 transport packet 202 which has a fixed length of 188 bytes. In some embodiments, of these 188 bytes, the first four bytes, as detailed in FIGS. 2A and 2B, constitute a packet header 204, and the remaining 184 bytes constitute a packet payload 206. Packet header 204 starts with a sync byte 207, which is a one byte long sync code of hexadecimal value 0x47. The remaining three bytes of packet header 204 describe the contents of packet payload 206. Specifically, bit numbers 12 to 24 define a packet identifier (PID) 208 which, for all base tables, has the same hexadecimal value 0x1 FFB. The MPEG-2 standard designates packet payload 206 as a private section.

Figure 2C:
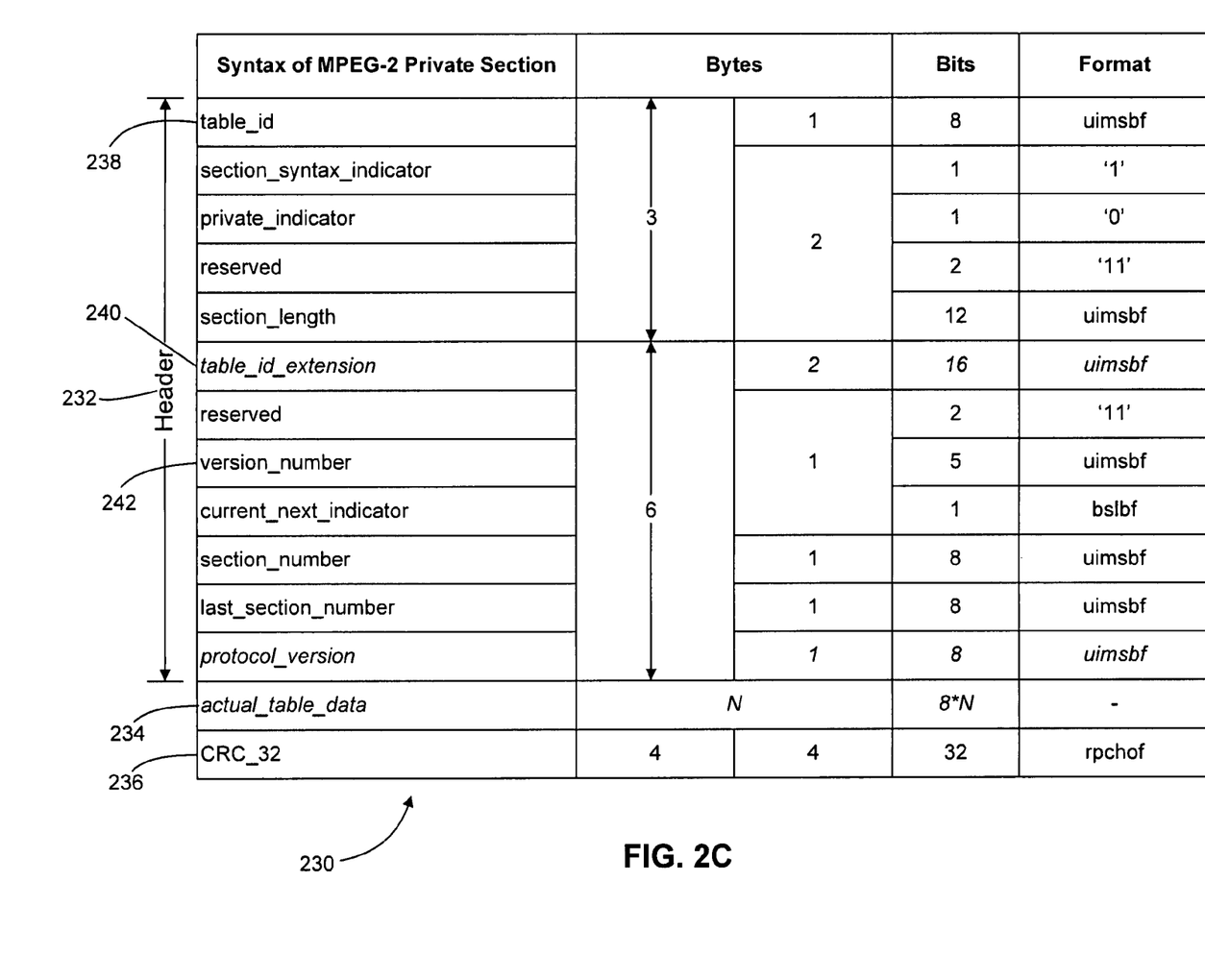
Figure 2D:
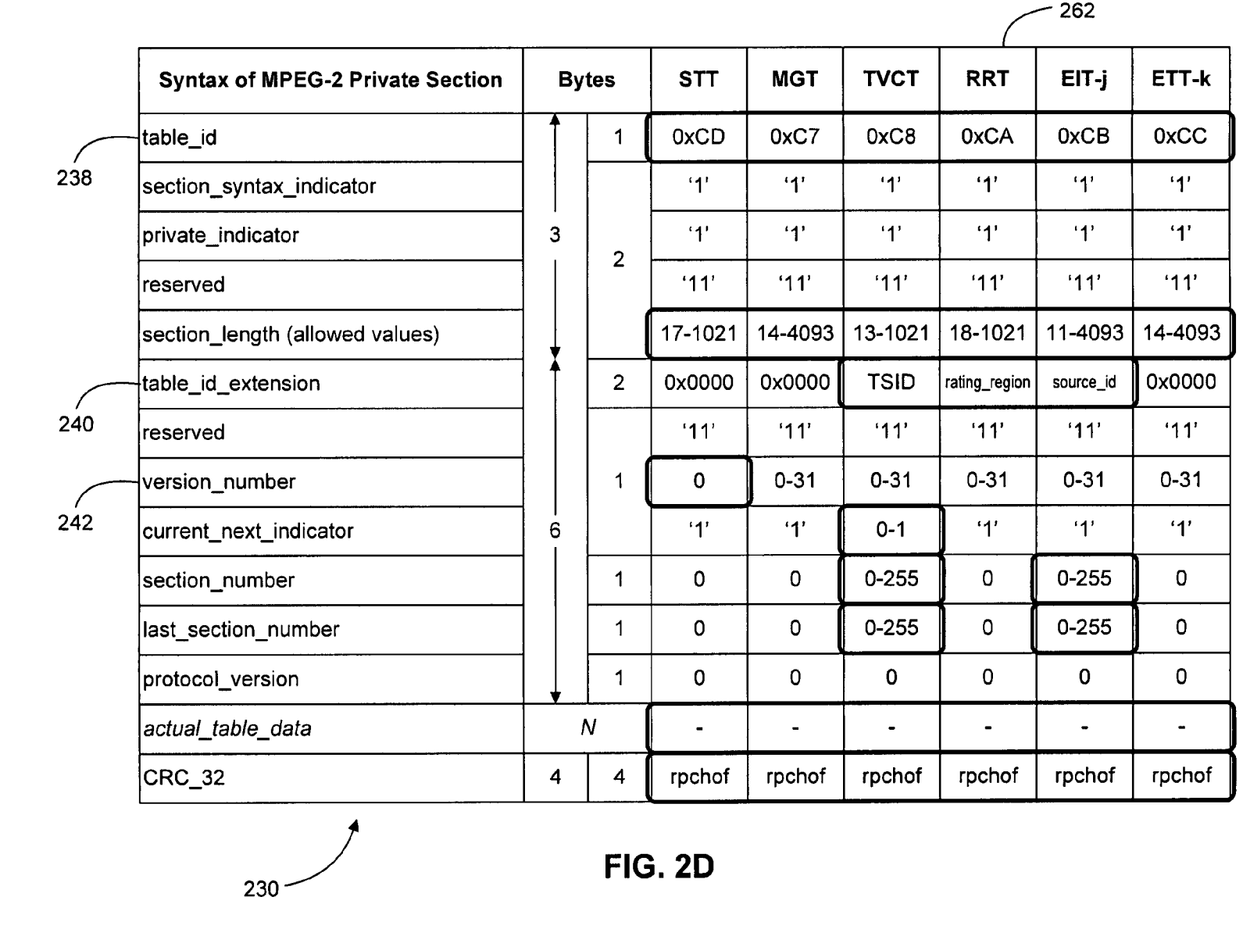

FIGS. 2C and 2D depict the format and structure of a private section 230, for transport packets corresponding to different tables as defined by PSIP, and as used by some embodiments herein. The first nine bytes of private section 230 constitute header section 232. Next, private section 230 includes an actual table data section 234, and four bytes for a cyclic redundancy check CRC_32 236 at the end. Header section 232 starts with a table_id 238, which is one byte that identifies the PSIP table. Header section 232 also includes two bytes for a table_id_extension 240 and five bits for a version_number 242. FIG. 2D shows, among other things, the values of table_id 238 for different base tables. In particular, as shown in column 262 corresponding to the RRT, table_id 238 has a hexadecimal value 0xCA. Therefore, RRT packet identifier module 132 can use the value of table_id 238 to determine whether a transport packet carries RRT information.

RRT update module 134 requires information to determine whether or not an RRT is a duplicate of a previously received RRT. Two RRTs might differ because they correspond to two different regions, or because they are different versions of an RRT belonging to the same region, alternatively called different versions of the same RRT. In some embodiments, RRT update module 134 determines the region and version of an RRT using table_id_extension 240 and version_number 242, as shown in FIGS. 2C and 2D. Table_id_extension 240 for the RRT, in particular, is called rating_region, and uniquely identifies the region for which the RRT is defined. For each regional RRT, the value of version_number 242 determines the version of RRT which, with its five bit size, can take on values between 0 and 31. The value of version_number 242 is initialized at 0, and is incremented each time the RRT is updated. After version_number 242 reaches 31, upon next update, it is incremented to 0.

Figure 2E:
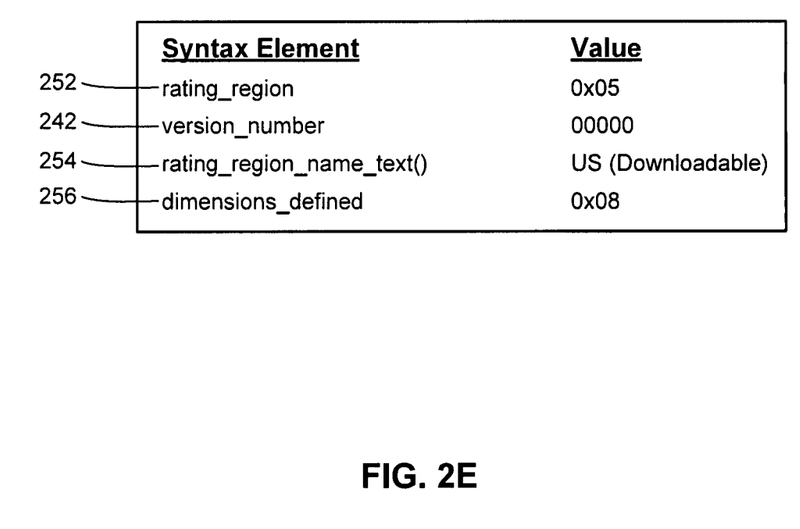

FIG. 2E shows values of four fields for an exemplary RRT, called RRT5. In this exemplary RRT5, the hexadecimal value of the rating_region field 252 is set to 0x05, which uniquely indicates RRT5's rating region. Further, the value of the field rating_region_name_text 254 defines the name associated with that rating region, in this case "Downloadable." The value of the field version_number 242 for this exemplary RRT5 is 00000. Also, the value of the field dimensions_defined 256 is 0x08, indicating that this version of RRT5 defines eight dimensions, based on which programs can be rated.

In some embodiments each new version of an RRT should be backward compatible with the previous version, that is, it must include all dimensions and for each dimension, all levels defined in the previous version. Therefore, updating an RRT to a new version can include adding (and not deleting) one or more dimensions to the RRT. Alternatively, updating an RRT to a new version can include adding (and not deleting) one or more rating levels to one or more existing dimensions, such that the added levels are higher than existing levels in the corresponding dimension. Backward compatibility is useful in that when a program is rated in accordance to an older version of an RRT, its rating can still be decoded and used under a new version of the same RRT, that is an RRT that has the same rating_region but a newer version_number. Therefore, the CAD for a program specifies the one or more rating regions that it uses, but does not specify the version of RRT for each of those rating regions.

Figure 3:
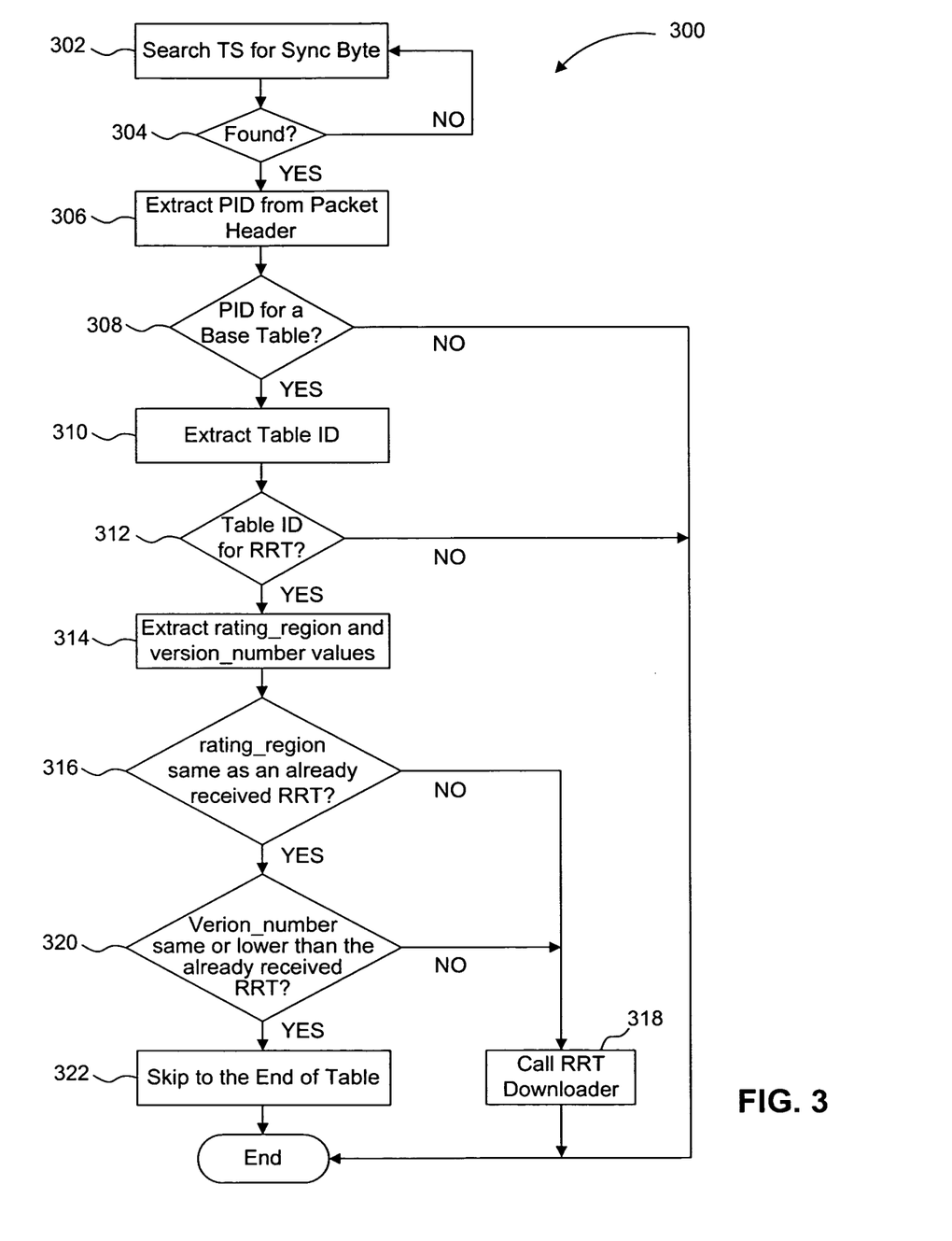
FIG. 3 illustrates a process performed by an RRT detector, in accordance with an exemplary embodiment.

FIG. 3 illustrates a process 300 performed by RRT detector 122, in accordance with an exemplary embodiment. RRT detector 122 receives transport packets 202 of metadata stream 136 and analyzes each transport packet 202 as detailed in steps 302 to 320. In some embodiments, steps 302 to 312 are performed by RRT packet identifier module 132, and steps 314 to 322 are performed by RRT update module 134. Further, in some embodiments, RRT detector 122 repeats process 300 on different transport packets 202.

In step 302, RRT packet identifier module 132 searches all bits in a metadata stream 136 for sync byte 207 with value 0x47 for an MPEG-2 transport packet. Finding sync byte 207 in step 304 (step 304=Yes) indicates the start of a transport packet 202, and process 300 proceeds to step 306. If sync byte 207 is not found (step 304=No), then RRT packet identifier module 132 continues to search for sync byte 207 in metadata stream 136. In step 306, RRT packet identifier module 132 extracts PID 208 from packet header 204. If, in step 308, RRT packet identifier module 132 determines the value of PID 208 to be that of a base table, that is 0x1FFB (step 308=Yes), then RRT packet identifier module 132 identifies the received packet to belong to a base PSIP table and proceeds to step 310. Otherwise, if RRT packet identifier module 132 determines the value of PID 208 to be different from 0x1FFB (step 308=No), then RRT packet identifier module 132 identifies the received packet not to belong to a base PSIP table and ends process 300.

In step 310, RRT packet identifier module 132 extracts table_id 238 from the private section 230 of the transport packet, and in step 312, determines whether the base table is an RRT, by determining if the value of table_id 238 is that of an RRT, that is 0xCA in this embodiment.

If table_id 238 is equal to that of an RRT (step 312=Yes), then process 300 proceeds to step 314; and otherwise, if table_id 238 is not equal to that of an RRT (step 312=No), then process 300 ends. In step 314, RRT update module 134 extracts the values of rating_region 252 and version_number 242 from private section 230 of the newly received RRT packet. In step 316, RRT update module 134 compares the newly received rating_region 252 with that of one or more previously received and stored RRTs. DTV receiver 104 may have stored more than one RRTs when, for example, it is located in the coverage area of more than one rating region, e.g., near the border of the U.S. and Canada, and therefore may receive RRTs and CADs related to each of those rating regions.

If the newly received rating_region is not the same as the rating_region for any of the previously stored RRTs (step 316=No), RRT update module 134, in step 318, calls RRT downloader 124 to download the newly received RRT which is related to a rating region not previously detected. On the other hand, if the newly received RRT has the same rating_region value 252 as that of one specific previously received RRT (step 316=Yes), then the rating region is not new to DTV receiver 104. The process thus proceeds to step 320, in which RRT update module 134 compares the version_number for the newly received RRT with the stored version_number of that specific RRT. If the newly received version_number is higher, indicating that the newly received RRT is a newer version of that specific previously received RRT (step 320=No), RRT update module 134 proceeds to step 318 and calls RRT downloader 124 to download the newly received version of that specific RRT and delete the older version. Otherwise, if RRT update module 134 determines that the version of the newly received RRT is the same or lower (respectively indicating the same version or an older version) compared to the specific previously received RRT (step 320=Yes), then the process skips reading the rest of the RRT (step 322) and ends. In some embodiments, step 322 causes DTV receiver 104 not to store the received transport packet and possibly subsequent transport packets which correspond to the newly received RRT.

Figure 4:
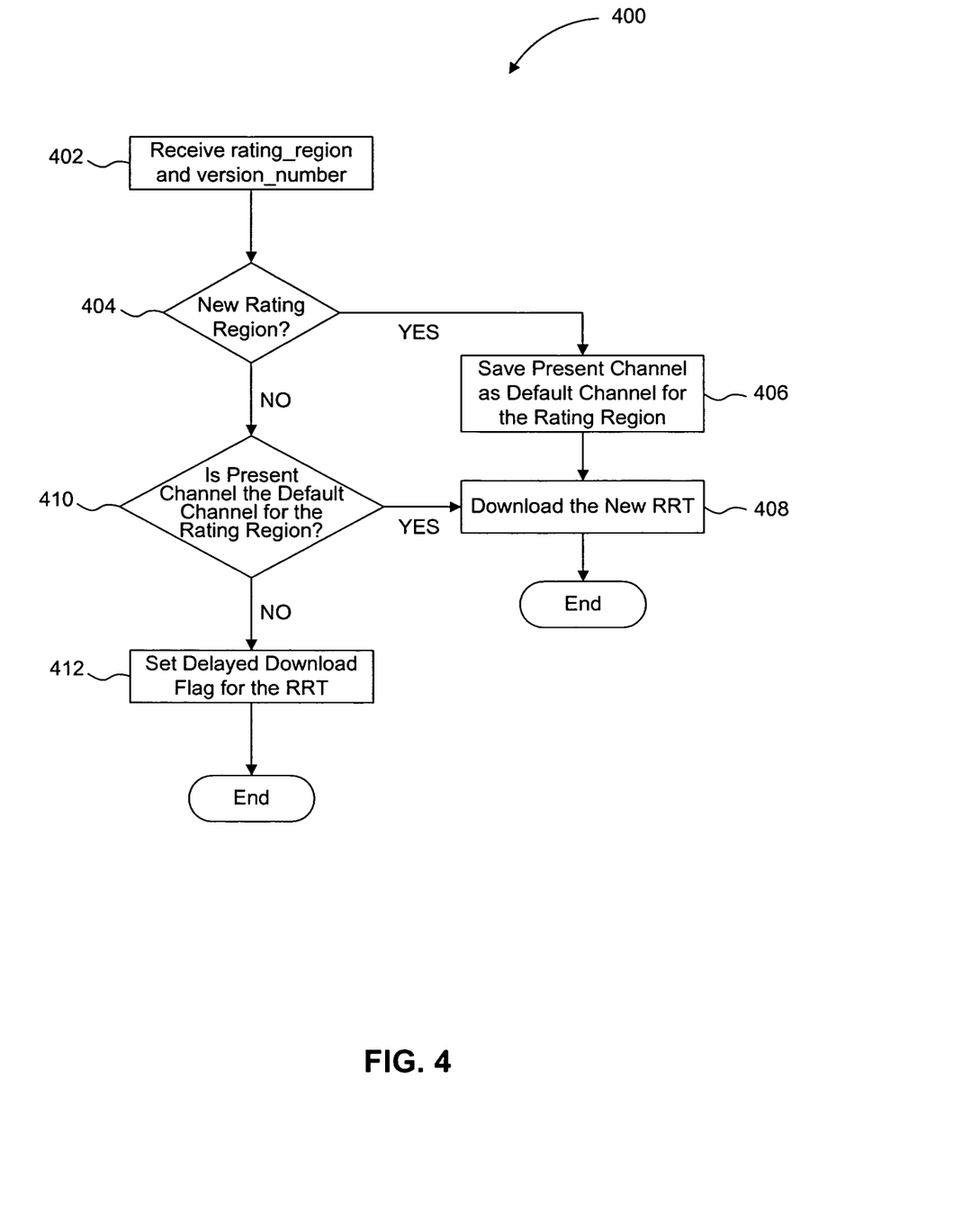
FIGS. 4 and 5 illustrate processes performed by an RRT downloader, in accordance with exemplary embodiments.

FIG. 4 illustrates a download process 400 performed by RRT downloader 124, in accordance with an embodiment. When called by RRT update module 134 in step 318 of process 300, RRT downloader 124, in step 402, receives the values of rating_region 252 and version_number 242 of the newly received RRT. RRT update module may also provide a "new RRT or new version" flag which indicates, as determined by steps 316 or 320 of process 300, whether the newly received RRT is a new RRT that was not previously stored, or a new version of an RRT that was previously stored.

In step 404, RRT downloader 124 uses the received rating_region or alternatively the "new RRT or new version" flag to determine whether the newly received RRT is a new RRT, i.e., having a rating_region value not previously received. If the newly received RRT is a new RRT (step 404=yes), the process proceeds to step 406, in which RRT downloader 124 stores the identification of the present channel to which the DTV receiver 104 is tuned as the default channel for the new RRT. The default channel may be a physical or a virtual channel. As explained below, the default channel will be designated as the preferred channel to download future versions of the newly received RRT. Moreover, in step 408, RRT downloader 124 proceeds to download the packets for the newly received RRT, and store them in memory 135. In some embodiments, RRT downloader 124 stores the newly received RRT information in a memory which is also accessible to RRT detector 122, and program guide module 120. RRT detector 122 uses sections of the newly received RRT for comparison with each subsequently received RRT to determine whether the subsequently received RRT is a duplicate or an update. Program guide module 120 uses RRT information for determining a rating scheme used for a program, and for determining the rating of the program, as reflected in the CAD for that program.

On the other hand, if the newly received RRT is not a new RRT (step 404=no), i.e., its rating_region value has already been saved as a specific previously received RRT, the RRT downloader 124 determines that the newly received RRT must be a new version of that specific RRT. In some embodiments, the previously saved RRT is an RRT previously received via a metadata stream on a channel. In some other embodiments, the previously saved RRT is an RRT that was pre-programmed in the digital television by the manufacturer. In step 410, RRT downloader 124 compares the identification of the present channel with that of the default channel for that specific RRT. If they are the same (step 410=yes), the process proceeds to step 408 for downloading the new version of that specific RRT over the present channel. Alternatively, if the present channel is not the same as the default channel for that specific RRT (step 410=no), the process proceeds to step 412, in which RRT downloader 124 sets a "delayed download" flag indicating that the newly received RRT should be downloaded at a later time, stores the rating_region of the newly received RRT in memory 135, and ends process 400. In some embodiments, RRT downloader 124 may set the "delayed download" flag and thereby delay the downloading even when the present channel is the default channel for the specific RRT. In these embodiments, RRT downloader 124 may, for example, delay downloading if the television cannot immediately download the newly received RRT, e.g., due to a shortage of memory.

In some embodiments, RRT downloader 124 receives a new RRT through a connection, e.g., an internet protocol (IP) connection, between the digital television and the internet, or through a connection, e.g., a USB connection, between the digital television and a solid state memory, e.g. a flash drive. Such connections may be established, for example, to upgrade the digital television.

Figure 5:
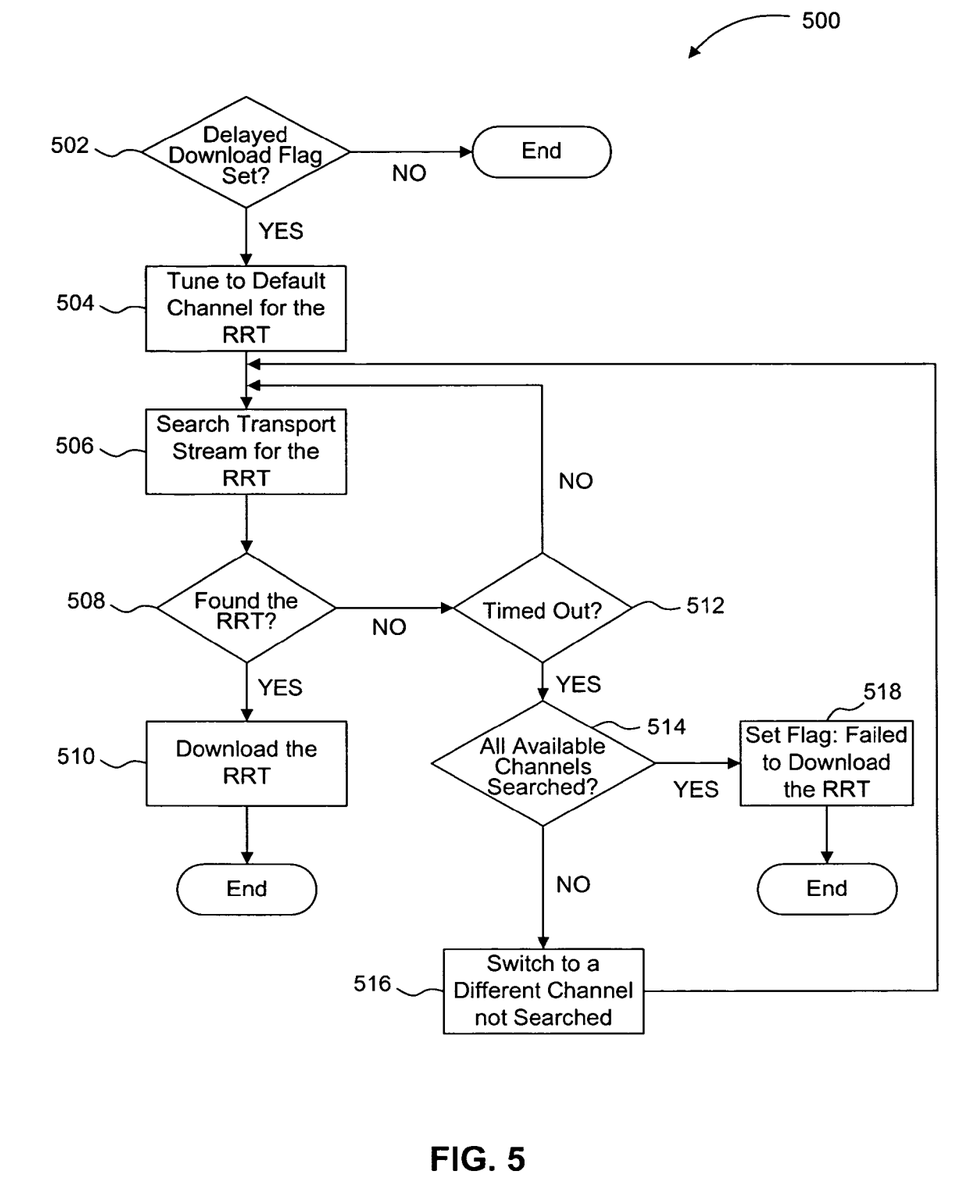

FIG. 5 illustrates a delayed download process 500 performed by RRT downloader 124, in accordance with an embodiment. In some embodiments, RRT downloader 124 performs a delayed download during the time that DTV receiver 104 is in a sleep mode, that is, when DTV receiver 104 is powered on but is not being used for showing a program. In other embodiments, RRT downloader 124 performs delayed download process 500 as a background process, while DTV receiver 104 is being tuned to the default channel for the specific RRT and also used for showing a television program on that channel. In step 502, RRT downloader 124 checks whether the "delayed download" flag is set, indicating that a new version of an RRT is available to be downloaded. If the flag is not set (step 502=no), RRT downloader 124 ends process 500. On the other hand, if the flag is set (step 502=yes), RRT downloader 124, in step 504, retrieves from memory 135 the rating_region value of the newly received RRT, and the identification of the default channel for that RRT, and tunes to that default channel. In some embodiments, RRT 124 can only tune to that default channel if DTV receiver 104 is in sleep mode or is already tuned by the user to that default channel. In step 506, RRT downloader 124 searches for the newly received RRT through the packets in the transport stream broadcast over the channel to which it is tuned. To that end, RRT downloader 124 performs steps similar to steps 302 to 314 in process 300 to extract an RRT and compares the rating_region of the extracted RRT with the rating_region of the newly received RRT. If RRT downloader 124 finds the newly received RRT (step 508=yes), RRT downloader 124, in step 510, extracts the newly received RRT from the transport stream, saves it to memory 135, and ends process 500. In some embodiments, RRT downloader further verifies that the newly received RRT is a new version of specific RRT before saving the newly received RRT to memory.

Alternatively, if RRT downloader 124 does not find the newly received RRT the transport stream broadcast over the default channel (step 508=no), RRT downloader 124 may repeat that search one or more times. In some embodiments, after each failed search, RRT downloader 124 repeats the search over the default channel once every day for a predetermined period of time, e.g., seven days. In some embodiments, after each failed search, RRT downloader 124 increments a counter which counts the number of failed search attempts. After each failed attempt (step 508=no), RRT downloader 124 checks whether the number of failed attempts has reached a maximum pre-set number or, equivalently, whether the total period of repeating the search attempts has reached a time out period (step 512). If the time out limit, or maximum counter value, has not been reached (step 512=no), RRT downloader 124 repeats the search in step 506, after waiting for a preset waiting period, e.g., one day. On the other hand, if the time out period, or maximum counter value, has been reached (step 512=yes), RRT downloader 124 stops searching the default channel for the newly received RRT, and determines that the download from the default channel has failed.

In some embodiments, if RRT downloader 124 determines that downloading from the default channel has failed, it examines alternative channels other than the default channel for the newly received RRT, and for each alternative channel, repeats the search. To that end, RRT downloader 124 keeps track of all channels in which it has searched for the newly received RRT and, in step 514, checks whether it has searched all available channels. If RRT downloader 124 has not yet searched all available channels (step 514=no), it switches to a new, not already searched channel in step 516, and repeats the process of searching the new channel for the newly received RRT, starting in step 506, in a manner similar to that done for the default channel. In some embodiments, the time out period or maximum counter value differs for different channels, e.g., for the default channel compared to an alternative channel. If RRT downloader 124 has already searched all available channels, and failed to find the newly received RRT (step 514=yes), RRT downloader 124, in step 518, determines that it has failed to download the newly received RRT. In some embodiments, upon such failure, RRT downloader 124 sets a flag which is later used by the DTV receiver 104 to address the issue accordingly. In some embodiments, upon such failure, an appropriate message may be shown to the user by DTV receiver 104 on the television receiver. In some other embodiments, RRT downloader 124 only searches the default channel, and upon failure in that search, sets the failure flag and ends process 500.

In some embodiments, RRT downloader 124 downloads and temporarily stores two copies of a new RRT, e.g. in step 408, or a new version of an RRT, e.g., in step 510, and compares the two copies to confirm that the download has been complete. Once confirmed that the two copies are identical, RRT downloader stores either copy of the downloaded RRT. If the two copies are not identical, e.g., due to an error during downloading of one or both, RRT downloader 124 further determines which of the two copies, if any, is the correct copy. In some embodiments, RRT downloader 124 makes such a determination by downloading one or more additional copies of the RRT and comparing them with each other, e.g., by calculating and comparing checksum of each copy. Once RRT downloader 124 finds a number (two or more) of the downloaded RRT copies to be consistent, RRT downloader 124 can save one of those copies, and delete other downloaded copies. Also, in some embodiments, upon downloading a new version of a previously received RRT, e.g., at step 510, RRT downloader 124 deletes the previous version of the same RRT, such that at any time, only one version of the RRT for a specific rating_region is stored. Further, in some embodiments, once an RRT is downloaded by a DTV receiver 104, the user can not delete that RRT from DTV receiver 104.

Upon downloading a new RRT or a new version of an RRT in step 408 or 510, RRT downloader 124 may notify the television user, e.g., by displaying a message on the television display, that a new rating scheme or a new version of a previously used rating scheme is available. Thereafter, the user may choose to update user preferences based on the newly downloaded RRT. For instance, the user may choose to define the user's preference based on a new rating scheme as detailed in a new RRT. Alternatively, when a new version of a previously used RRT has been downloaded, the user may choose to redefine the user's preferences based on the newly added dimensions or the newly added levels in that previously used RRT.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method performed by a digital television receiver associated with a television, comprising:
    storing in a memory a first rating configuration, including a region identification of the first rating configuration and a version identification of the first rating configuration, for rating a television program in accordance with a rating scheme;
    storing in the memory an identification of a first television channel as a default channel for the rating scheme;
    receiving a subset of a group of transport packets via a receiving channel that is one of the first television channel or a second television channel;
    extracting a region identification of a second rating configuration and a version identification of the second rating configuration from the subset of the group of transport packets;
    comparing the region identification and the version identification of the second rating configuration with the region identification and the version identification of the first rating configuration, respectively;
    verifying that the region identifications of the first and the second rating configurations are the same;
    verifying that the second configuration is newer than the first rating configuration;
    attempting to download, via a downloader, the second rating configuration over the default channel; and
    if the download succeeds, storing in the memory the downloaded second rating configuration for rating in accordance with the rating scheme.

2. The method of claim 1, wherein the rating scheme is a first rating scheme, the method further comprising, if the region identification of the second rating configuration is different from the region identification of the first rating configuration indicating that the second rating configuration is in accordance with a second rating scheme different from the first rating scheme:
    downloading over the receiving channel the second rating configuration;
    storing in the memory the second rating configuration including the region identification and the version identification of the second rating configuration, for rating in accordance with the second rating scheme; and
    storing in the memory an identification of the receiving channel as a default channel for the second rating scheme.

3. The method of claim 1, further comprising notifying a user of the television that the second rating configuration is available for rating in accordance with the rating scheme.

4. The method of claim 1, wherein the downloaded second rating configuration is a first copy of the second rating configuration, the method further comprising:
    downloading a second copy of the second rating configuration over the default channel;
    comparing the first copy and the second copy of the second rating configuration; and
    if the first and the second copies are not identical, determining one of the first and the second copies as a correct copy of the second rating configuration and deleting the other one of the first and the second copies.

5. The method of claim 1, further comprising deleting from the memory the first rating configuration.

6. The method of claim 1, wherein attempting to download the second rating configuration is performed when the digital television receiver is in sleep mode.

7. The method of claim 1, wherein if the download fails, the method further comprises switching to a channel different from the default channel and retrying downloading the second rating configuration over the channel different from the default channel.

8. The method of claim 2, further comprising notifying a user of the television that the second rating configuration is available for rating in accordance with the second rating scheme.

9. The method of claim 1, wherein the group of transport packets is a later received group of transport packets, and wherein the first rating configuration is included in an earlier received group of transport packets received via the first television channel.

10. The method of claim 1, wherein the first rating configuration and the identification of the first television channel are pre-programmed in the digital television receiver.

11. The method of claim 1, wherein the first rating configuration includes a plurality of rating levels, and the group of transport packets is a first group of transport packets, the method further including:
    storing, in the memory, a set of user preferred rating levels selected from the plurality of rating levels;
    receiving a second group of transport packets via the first television channel or the second television channel or a third television channel, the second group of transport packets including television program signals and further including information attributing one rating level of the plurality of rating levels to the television program signals;
    extracting the one rating level for the television program signals and comparing the one rating level for the television program signals with the set of user preferred rating levels; and
    blocking the television program signals from being transmitted to the television, if the one rating level for the television program signals is not in the set of user preferred rating levels.

12. The method of claim 1, wherein receiving the group of transport packets is performed based on MPEG-2 standard.

13. The method of claim 2, wherein the first and the second rating configuration include a first and a second plurality of rating levels, respectively, and the group of transport packets is a first group of transport packets, the method further comprising:
    storing, in the memory, a first set and a second set of user preferred rating levels respectively selected from the first and the second plurality of rating levels;
    receiving a second group of transport packets via the first television channel or the second television channel or a third television channel, the second group of transport packets including television program signals and a rating level of the television program signals, and information about a rating scheme of the television program signals specified as one of the first and the second rating schemes;
    extracting the rating level of the television program signals and comparing the rating level of the television program signals with the first set or the second set of user preferred rating levels if the specified rating scheme is the first or the second rating scheme, respectively; and blocking the television program signals from being transmitted to the television, if the rating level of the television program signals in not in the first set or the second set of user preferred rating levels with which it is compared.

14. A digital television receiver which receives television signals via one or more television channels, the television signals including regional rating table (RRT) information used for rating a television program embedded in the television signals, the digital television receiver comprising:

a memory for storing a previously received RRT, an RRT packet identifier, an RRT table identifier, an RRT region identification corresponding to the previously received RRT, and an RRT version identification corresponding to the previously received RRT;

an RRT downloader;

an RRT detector for detecting an embedded RRT which is embedded in the received television signals, the RRT detector comprising:

an RRT packet identifier module to identify, from among a plurality of transport packets received via a specific channel of the one or more television channels, a specific transport packet as an RRT header packet associated with a plurality of RRT packets which carry information related to the embedded RRT, wherein the RRT packet identifier module identifies the specific transport packet as an RRT header packet by extracting from the specific transport packet an embedded packet identifier and an embedded table identifier, and identifying the embedded packet identifier and the embedded table identifier to be the same as the stored RRT packet identifier and the stored RRT table identifier, respectively, and an RRT update module for determining whether the embedded RRT is a newer version of the stored previously received RRT, by extracting from the RRT header packet an embedded RRT region identification and an embedded RRT version identification, and by comparing the embedded RRT region identification and the embedded RRT version identification with the stored RRT region identification and the stored RRT version identification, respectively, the RRT update module causing the digital television receiver to skip analyzing a remainder of the plurality of RRT packets if the RRT update module determines that the embedded and the stored RRT region identifications are the same and the embedded RRT is not newer that the previously stored RRT, and, otherwise calling the RRT downloader; and the RRT downloader for tuning into a default channel for the stored RRT region identification and for downloading the embedded RRT via the default channel for the stored RRT region, if the embedded and stored RRT region identifications are the same and the embedded and stored RRT version identifications indicate that the embedded RRT is newer than the stored RRT.

15. The method of claim 1, wherein the receiving channel is different from the default channel and wherein the method further comprises storing an identification of the receiving channel as a new default channel for the rating scheme.

16. The digital television receiver of claim 14, wherein the RRT downloader is further for downloading and storing the embedded RRT via the specific channel, and storing the specific channel as a default channel for the embedded RRT region identification, if the embedded RRT region identification is different from the stored RRT region.

17. The digital television receiver of claim 14, wherein the RRT information is in accordance with an Advanced Television Systems Committee (ATSC) Program and System Information Protocol (PSIP).

18. A method performed by a digital television receiver for managing regional rating table (RRT) information used for rating a television program embedded in the television signals received via one or more television channels, the method comprising:

storing in a memory a previously received RRT, an RRT packet identifier, an RRT table identifier, an RRT region identification corresponding to the previously received RRT, and an RRT version identification corresponding to the previously received RRT;

detecting an embedded RRT which is embedded in the received television signals, by identifying, from among a plurality of transport packets received via a specific channel of the one or more television channels, a specific transport packet as an RRT header packet associated with a plurality of RRT packets which carry information related to the embedded RRT, wherein the identifying the specific transport packet as an RRT header packet is performed by extracting from the specific transport packet an embedded packet identifier and an embedded table identifier, and identifying the embedded packet identifier and the embedded table identifier to be the same as the stored RRT packet identifier and the stored RRT table identifier, respectively;

determining whether the embedded RRT is different from the stored previously received RRT, by extracting from the RRT header packet an embedded RRT region identification and an embedded RRT version identification, and by comparing the embedded RRT region identification and the embedded RRT version identification with the stored RRT region identification and the stored RRT version identification, respectively;

causing the digital television receiver to skip analyzing a remainder of the plurality of RRT packets, if the embedded RRT region identification and the embedded RRT version identification are same as the stored RRT region identification and the stored RRT version identification, respectively; and tuning into a default channel for the stored RRT region identification and downloading the embedded RRT via the default channel for the stored RRT region, if the embedded RRT region identification is same as the stored RRT region identification and the RRT version identification is newer than the stored RRT version identification.

19. The method of claim 18, further comprising downloading and storing the embedded RRT via the specific channel, and storing the specific channel as a default channel for the embedded RRT region identification, if the embedded RRT region identification is different from the stored RRT region identification.

20. The method of claim 18, wherein the RRT information is in accordance with an Advanced Television Systems Committee (ATSC) Program and System Information Protocol (PSIP).

21. A method performed by a digital television receiver associated with a television including a memory for saving a first rating configuration corresponding to a rating scheme, the method comprising:

receiving a region identification and a version identification of a second rating configuration;

comparing the region identification and the version identification of the second rating configuration respectively with a region identification and a version identification of the first rating configuration;

verifying that the region identification of the second rating configuration is the same as the region identification of the first rating configuration;

verifying that the version identification of the second rating configuration is newer than the version identification of the first rating configuration; and storing in the memory the second rating configuration, including the region identification and the version identification of the second rating configuration, for rating in accordance with the rating scheme.

22. The method of claim 21, wherein the rating scheme is a first rating scheme, the method further comprising, if the region identification of the second rating configuration is different from the region identification of the first rating configuration, indicating that the second rating configuration is in accordance with a second rating scheme different from the first rating scheme:

storing in the memory the second rating configuration including the region identification and the version identification of the second rating configuration, for rating in accordance with the second rating scheme.

23. The method of claim 21, further comprising notifying a user of the television that the second rating configuration is available for rating in accordance with the rating scheme.

24. The method of claim 21, further comprising deleting from the memory the first rating configuration.

25. The method of claim 22, further comprising notifying a user of the television that the second rating configuration is available for rating in accordance with the second rating scheme.

26. The method of claim 21, wherein receiving is performed through an external connection including one or more of USB, wired Ethernet, wireless Ethernet, solid state memory, world wide web, and internet connection.

* * * * *